Figure 1:
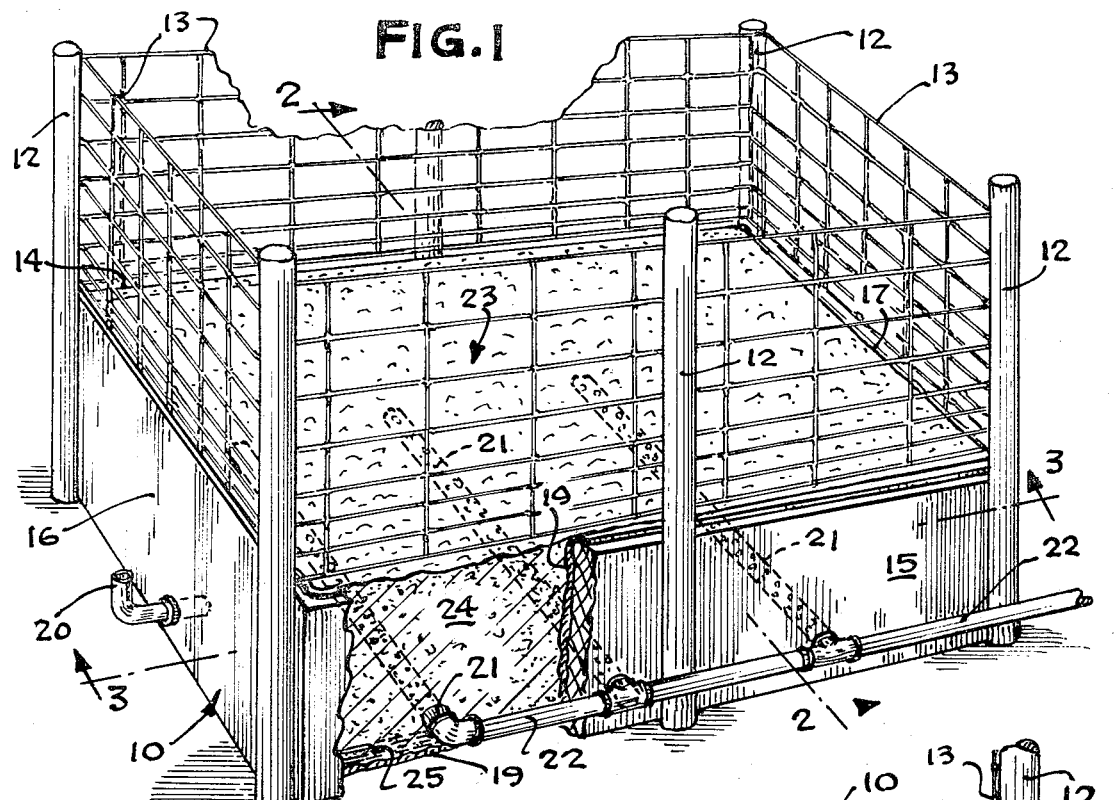

United States Patent [19]
Stevenson

[11] 3,718,119
[45] Feb. 27, 1973

[54] SELF-CLEANING ANIMAL ENCLOSURE STRUCTURE

[76] Inventor: Howard Jackson Stevenson, P.O. Box 33, Jacksonville, Ill. 62650

[22] Filed: Nov. 26, 1971

[21] Appl. No.: 202,188

[52] U.S. Cl. .................................... 119/28, 4/115
[51] Int. Cl. ............................................. A01j 1/00
[58] Field of Search .......... 119/15, 20, 27, 28; 4/115, 4/116

[56] References Cited

UNITED STATES PATENTS

| | | | |
|---|---|---|---|
| 3,225,739 | 12/1965 | Brodrick | 119/28 X |
| 3,662,715 | 5/1972 | Schapler | 119/28 |
| 3,666,106 | 5/1972 | Green | 4/115 X |

Primary Examiner—Louis G. Mancene
Assistant Examiner—J. N. Eskovitz
Attorney—Lowell C. Noyes et al.

[57] ABSTRACT

An enclosure structure for animals, such as livestock and poultry, which does not require removal of body waste material from the enclosure having a floor structure comprising a bed of loosely packed inert particulate material, such as sand, with an upper aerated layer containing aerobic bacteria and a lower water-permeated layer containing anaerobic bacteria; wherein the aerobic bacteria initially act on the body waste material deposited on the floor of the enclosure to decompose the waste substantially into products which filter down into the lower layer of the bed where the anaerobic bacterial substantially decompose the products. Means are provided for controlling the depth of the water in the bed and for aerating the upper layer of the bed.

7 Claims, 3 Drawing Figures

PATENTED FEB 27 1973　　　　　　　　　　　　　3,718,119

SELF-CLEANING ANIMAL ENCLOSURE STRUCTURE

The present invention relates generally to enclosures for animals and more particularly to a self-cleaning structure for retaining livestock and poultry.

It has long been difficult to maintain pens in which livestocks and poultry are kept clean and particularly free of objectionable odors and body waste material. The problem is particularly difficult where large numbers of animals, particularly livestock and poultry, are being raised. Moreover, where sows are bred, it is very important from an economic standpoint to have the pens comfortable and reasonably free of objectionable waste material so that larger litters are produced and the sows and litters kept healthy.

Various mechanical means have been suggested for removing animal body waste materials from barns and pens in which livestock or poultry are kept, but these mechanical means require considerable expense to build and maintain. Moreover, there is still the problem of disposing of the body waste materials and the like after being removed from the barns and pens by the mechanical means.

It is therefore an object of the present invention to provide an improved animal enclosure structure and method of maintaining an enclosure structure substantially free of objectionable body waste materials which does not require mechanical means for removal of the body waste materials.

It is a further object of the present invention to provide a self-cleaning pen for livestock and poultry which can be kept substantially free of body waste materials without the use of mechanical means by removing the body waste materials.

It is also an object of the present invention to provide a self-cleaning pen in which livestock can be bred and raised under conditions conducive to improved health of the animals.

Figure 2:
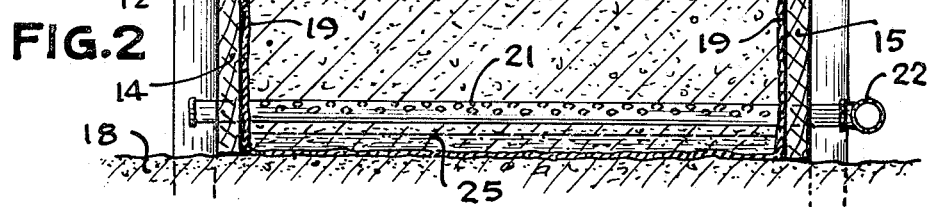
Figure 3:
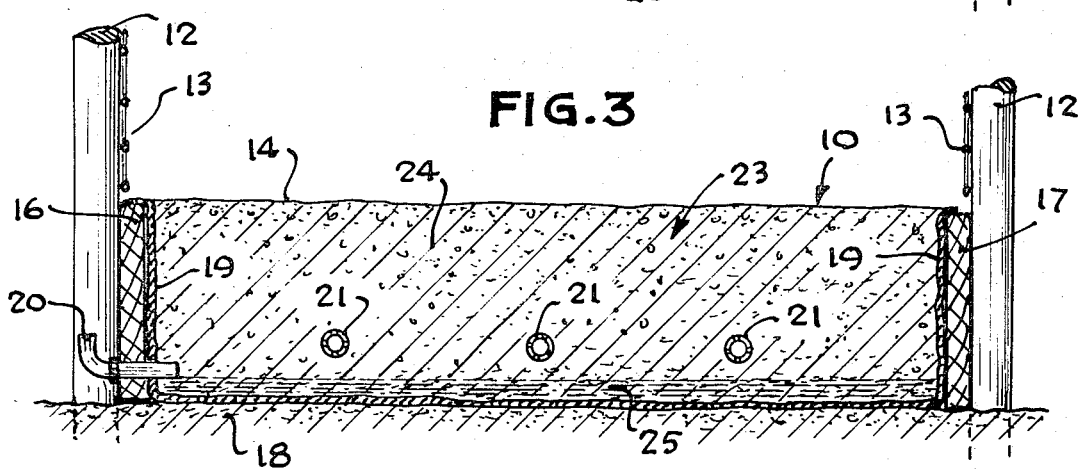

Other objects of the present invention will be apparent from the detailed description and claims which follow when read in conjunction with the accompanying drawing, whereby, FIG. 1 is a perspective view partially in vertical section of an animal enclosure embodying the present invention;

FIG. 2 is a transverse vertical sectional view taken along the line 2—2 of FIG. 1, and FIG. 3 is a longitudinal vertical sectional view taken along the line 3—3 of FIG. 1.

It has long been known that both aerobic and anaerobic bacteria microorganisms can decompose organic matter. Aerobic bacteria operate in the presence of air and moisture and at relatively high temperatures, while anaerobic bacteria require a moist, airless environment under cooler temperature conditions than aerobic bacteria.

A way has now been found to utilize in sequential combination the properties of both aerobic and anerobic bacteria to effect substantial decomposition of body waste materials which normally accumulate on the floor of an enclosure or pen in which poultry or livestock, such as pigs, are kept and at a rate which avoids objectionable accumulation of body waste materials by providing a pen with a bottom or floor structure in which the aerobic bacteria react in-situ on the organic matter in the body waste materials deposited within the pen and thereafter having the anaerobic bacteria act on the decomposition products produced by the aerobic bacteria while the decomposition products remain within the floor structure of the pens.

In one operative pen structure embodying the present invention, one or more pens 10 housed within a barn or like structure to permit conveniently controlling the temperature and humidity are provided with a floor portion 11 on which the animals tread having a rectangular form approximately 8 feet long and 4 feet wide but which could be of any desired shape and size and in the form illustrated are constructed by interconnecting vertically disposed side wall sections 14, 15 and end wall sections 16, 17 formed of any desired material, such as wood or concrete, but which could be formed simply of earthen walls. The walls 14–17 form an enclosure having a depth of at least about one to two feet. Vertically extending support posts 12 are provided at spaced points along the walls with wire screening 13 stretched between the posts 12 to form a retaining area extending above and around floor portion 11. The wall sections 14–17 are preferably formed of non-abrasive material in order to prevent the animals injuring themselves by contact with abrasive side walls. The wall sections 14–17 can be supported on a concrete subfloor surface 18 and, if desired, formed integrally therewith.

The inside surfaces of the wall sections 14–17 and the bottom surface 18 are coated or covered with a water proof material, such as a sprayed plastic coating material or plastic sheet material and the like, to form a water impervious retainer or liner 19 which prevents leakage of liquid from the inside of the floor structure of the pen and which might be a source of contamination. Means are provided for controlling the water level within the water proof liner 19 by providing one or more adjustable spigots or drains in the form of an elbow pipe fitting 20 extending through the liner 19 and the lateral wall section 16 with the inner end of the pipe fitting 20 preferably spaced a few inches above the bottom surface 18 (i.e. about two inches) and the outer end 19 preferably provided with means which permit adjusting the heighth of water in the liner above the surface 18. Also, extending into the interior of the enclosure formed by the wall sections 14–17 through at least one of the said wall sections and the contiguous portion of the liner 19 at a level several inches above the surface 18 are one or more horizontally extending perforated pipe sections 21 which can be interconnected by a header pipe 22 through which air can pass, as by applying pressure or vacuum, in order to effect aerating the upper portion of particulate material used to fill the water proof liner 19. The pipe sections 21 and header 22 can also serve as drains for water within the liner 19.

The water proof liner 19 is preferably filled with loosely packed granular particles of inert material, such as sand or the like natural or synthetic particulate material, to provide a bed 23 having a depth of about 1 to 2 feet and extending from the lower floor supporting surface 18 to the upper edge of the lateral wall sections 14–17. The bed 23 of particulate material, such as fine textured sand, having a uniform depth of from 1 to 2 feet comprises an upper strata or layer 24 permeable to air and moisture which is conveniently maintained under conditions of temperature and humidity which are conducive to the growth of aerobic bacteria and a lower strata or layer 25 of particulate material which is maintained under conditions conducive to the growth of anaerobic bacteria. In a climate where there are marked seasonal changes in temperature or humidity, it has been found most convenient to control the temperature and humidity condition within the layers 24, 25 of the bed 23 by providing an enclosure for the pens, such as a barn, having means for heating and/or cooling the interior of the barn so that the bed 23 is maintained at a temperature and humidity which promotes the desired growth of the bacteria in the bed 23, such as a temperature of about 75°F and a relative humidity at about 50 percent.

The depth or thickness of the lower layer 25 which forms the lower portion of the bed 23 and which comprises the anaerobic bacteria is determined by the depth of the water maintained in the water-proof liner 19, since the water does not provide sufficient oxygen for aerobic bacteria to survive therein but does permit anaerobic bacteria to grow therein.

In the structure shown in the accompanying drawing the water level can be readily maintained at a minimum depth equal to the distance the end of the fitting 20 is disposed above the lower surface of the liner 19. The depth of the water within the liner 19 can be increased, if desired, by increasing the height of the outer end of the fitting 20, and the fitting 20 can also be used to add water to the bed 23, if required. By varying the depth of the water within the liner 19, it is possible to vary the proportional parts of the bed effecting aerobic and anaerobic decomposition of the waste material therein. As the water within liner 19 may contain dissolved minerals or other compounds which could be considered pollutants, any water withdrawn from the liner 19 can be filtered through suitable material to remove the objectionable minerals or other compounds.

The upper layer 24 of the bed 23 containing the aerobic bacteria must be aerated to provide the oxygen essential for the survival and growth of the aerobic bacteria. Aeration can be effected by tilling the particulate material forming the upper layer 24, or, as in the form shown in the drawing, aeration is effected by causing air to flow inwardly or outwardly through small diameter perforations in the pipe sections 21. Moisture is supplied to the upper layer 24 from the atmosphere and by capillary action of the particles of sand forming the bed 23 which draws water from the water retained in the layer 25 forming the lower portion of the bed 23.

In use, the waste material deposited in the pen can be cultivated into the bed 23, as by tilling or preferably by means of the hooves of the animals, such as livestock, forcing the waste material deposited on the surface of the bed 23 into the upper layer 24 where the aerobic bacteria effects decomposition of the organic material and forms water, carbon dioxide, along with ammonia, nitrates, and leaving only a small amount of non-biodegradable minerals. The decomposition products from the aerobic layer 24 filter down into the anaerobic layer 25 where the anaerobic bacteria decompose ammonia into nitrates and nitrites and finally decompose these products into gaseous nitrogen. If desired, the filtering down of the decomposition products into the lower layer 25 can be accelerated by having liquid from the lower layer 25 elevated and brought into contact with at least a portion of the upper layer 24 to flush compositions in the upper layer 24 into the lower layer 25, similar to irrigation. Conduits similar to pipes 21 can be used for periodic circulation of water from layer 25 into layer 24 below the surface thereof.

Where the livestock or poultry within the pen 10 fail to work the waste material deposited on the floor 11 into the upper layer 24 adequately, the layer 24 can be tilled by any suitable hand tool or mechanical cultivator, such as a rototiller or the like means designed to loosen, breakup and lift the material and allow the material to aerate before falling back into the bed 24. Tilling can be effected once every 24 hours or more frequently, if desired.

As a result of the novel arrangement of parts and the sequential decomposition steps, the body waste material deposited on the floor of the animal pen of the present invention is continuously dispersed and decomposed in the floor portion of the pen without producing objectionable odors or leaving objectionable waste products of the type which are normally associated with animal pens and the like structure.

I claim:

1. In an animal enclosure structure, a floor portion comprising a bed of loosely packed inert particulate material contained by a water-proof liner, said bed having an upper layer which is permeable to air and moisture and in which aerobic bacteria are adapted to grow and a lower layer contiguous with said upper layer in which water permeates the voids between the said particulate material forming said lower layer and in which anaerobic bacteria are adapted to grow; whereby organic waste material present in said bed is decomposed by said aerobic and anaerobic bacteria in said layers so as to provide a self-cleaning animal enclosure structure.

2. An animal enclosure structure as in claim 1, wherein means are provided for maintaining the level of water in said bed at a selected point therein, whereby the proportionate parts of said bed acting to effect aerobic decompositions and aerobic decomposition can be maintained to effect optimum rate of decomposition of said waste material.

3. An animal enclosure structure as in claim 2, wherein said means comprises a conduit extending outwardly from said bed through said water-proof liner from a point adjacent the lower surface of said liner.

4. An animal enclosure structure as in claim 1, wherein an aerating means is provided in said bed between the upper surface of said bed and said lower layer thereof to effect aeration of said upper layer of said bed.

5. In an animal enclosure structure of claim 1, said floor portion comprising vertical lateral wall sections and a transversely extending support surface below the upper edge of said wall section, said wall sections and support surface having said water-proof liner extending thereover forming a water impervious retainer open at the top, said retainer having said inert particulate material loosely packed therein and forming said bed, and means associated with said bed for controlling the amount of said water in said liner.

6. An animal enclosure structure as in claim 5, wherein said bed has associated therewith means for aerating said upper layer.

7. A method of removing organic waste material from an animal enclosure which comprises; forming as a floor portion of an animal enclosure a loosely packed bed of inert particulate material which is contained within a water impervious retainer, aerating and providing a source of moisture for the upper portion of said bed for effecting growth of aerobic bacteria therein, maintaining water at a selected level in the lower portion of said bed which fills the voids between the said particulate material forming the lower portion of said bed for effecting growth of anaerobic bacteria therein, and working said organic waste material deposited on the surface of said floor portion into said loosely packed bed; whereby said waste material is continually decomposed by the combined action of said aerobic and anaerobic bacteria in said bed.

* * * * *